Nov. 5, 1963 R. K. LEARMONT 3,109,544
APPARATUS FOR UNLOADING ARTICLES
Filed July 11, 1960 2 Sheets-Sheet 1
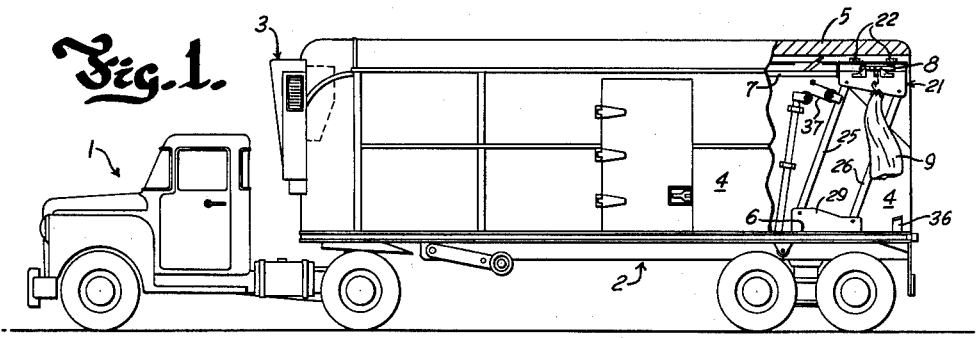
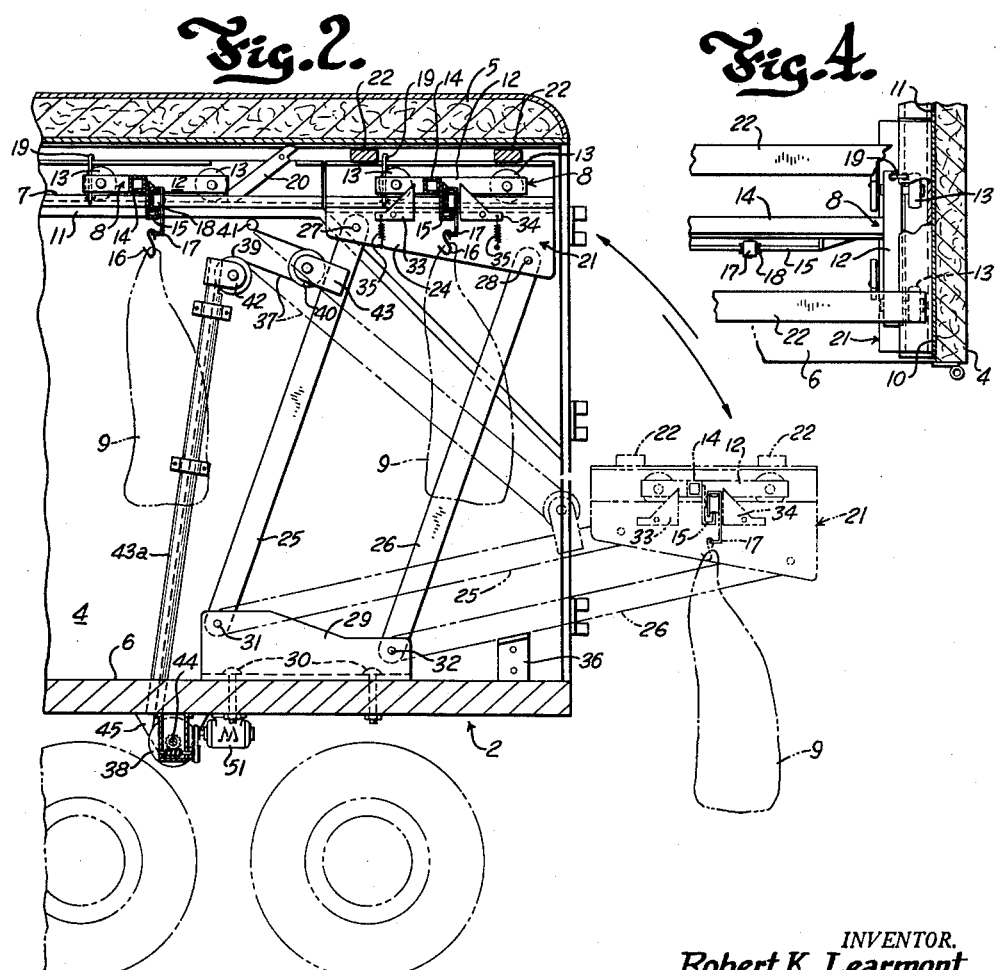
INVENTOR.
Robert K. Learmont
BY
Andrus & Starke
Attorneys

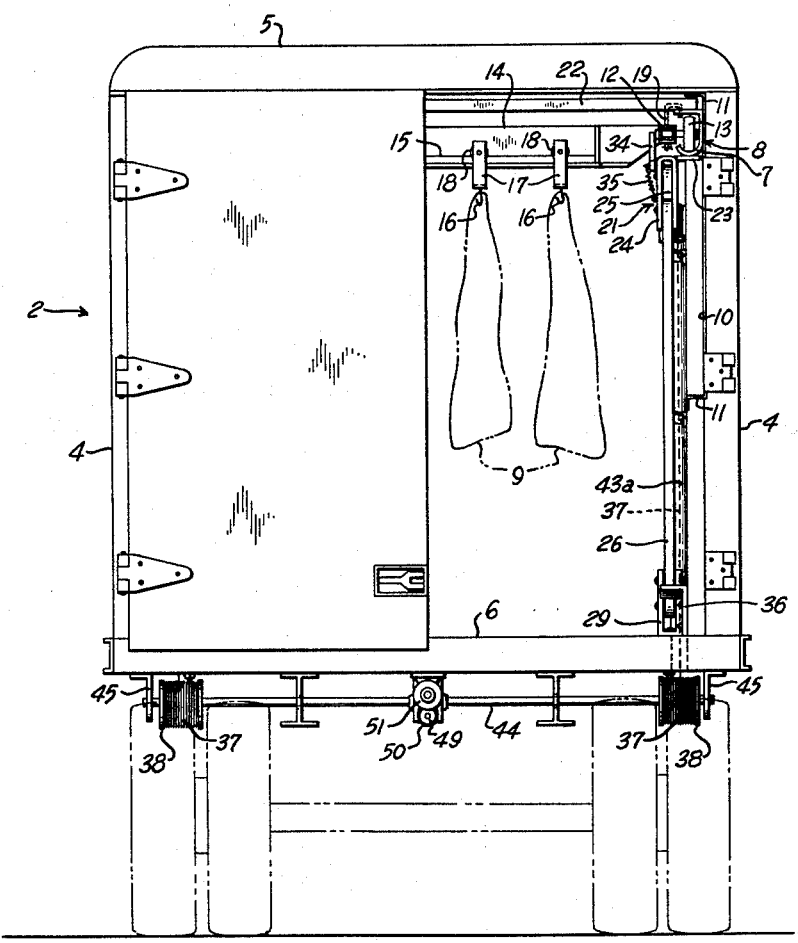
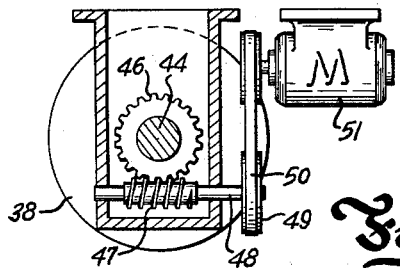

United States Patent Office 3,109,544
Patented Nov. 5, 1963

3,109,544
APPARATUS FOR UNLOADING ARTICLES
Robert K. Learmont, 11230 W. Upham Ave., Hales Corners, Wis., assignor of one-half to C. J. Williams, River Hills, Wis.
Filed July 11, 1960, Ser. No. 42,009
4 Claims. (Cl. 214—77)

This invention relates to an apparatus for unloading articles and more particularly to an apparatus for unloading food products from a trailer.

In the trucking industry, carcass quarters or other large sections of meat are loaded into a trailer by hanging the meat on hooks attached to rollers and feeding the rollers from a track or rail in the warehouse onto a track mounted on the ceiling of the trailer. However, when unloading the trailer, the unloading platform in many cases is not at the same height as the floor of the trailer and the meat sections or other products must be manually unloaded and handed down to workmen standing on the ground or at the level of the loading platform. As the meat sections are quite heavy, it normally requires from two to four men to unload the meat from a trailer onto the loading platform. Usually two men unload the meat from the hooks in the trailer and hand the meat down to two men standing on the ground. Because of the sanitary standards, it is not possible for the men in the trailer to set the meat down on the floor of the trailer, then jump to the ground and transfer the meat to the location of storage.

The present invention is directed to an apparatus for unloading meat or other articles from a trailer which substantially reduces the labor involved and increases the speed of the unloading operation.

More specifically, the trailer is provided with a pair of tracks which run substantially the length of the side wall of the trailer and a series of carriages or dollies ride on the track. Each carriage includes a meat rail which extends transversely of the trailer and the carcass sections of meat are suspended from roller units which are supported by the meat rail. The track and carriage structure is substantially similar to that described in the copending patent application, Serial No. 13,135, filed March 7, 1960, of the same inventor.

According to the invention, a separate track section is disposed in alignment with each of the longitudinal tracks and extends to the open rear end of the trailer. Each track section is pivotally connected to the upper ends of a pair of arms and the lower ends of the arms are pivotally connected to the side wall of the trailer adjacent the floor.

A drive mechanism is operably connected to each pair of arms to raise and lower the track sections from an upper position in alignment with the track to a lower position outwardly and slightly above the floor.

During unloading, each carriage, which supports a series of roller units carrying the meat sections, is fed or moved rearwardly onto the movable track section. The carriage is locked on the track section and the arms are then pivoted downwardly to lower the track section and the carriage to a position outwardly of the open end of the trailer and above the floor where the meat can be conveniently removed from the hooks by workmen standing on the ground. After removal of the meat, the carriage is removed from the track section and the track section is returned to its upper position in alignment with the track to receive a second carriage for unloading.

The apparatus of the invention enables a single man to unload meat sections or other heavy articles from the trailer. The carriages are merely moved into position on the track sections and the track sections carrying the carriages are then lowered automatically to a position where the meat can be conveniently removed at ground level. The apparatus not only substantially reduces the number of men required to unload the meat, but also speeds up the unloading process and insures a more sanitary operation.

Other objects and advantages will appear in the course of the following description.

The drawings illustrate the best mode presently contemplated of carrying out the invention.

In the drawings:

FIGURE 1 is a side elevation of a tractor and trailer with parts broken away in section and showing the location of the unloading apparatus;

FIG. 2 is a vertical section of the trailer showing the meat unloading apparatus;

FIG. 3 is a rear elevation of the trailer with one of the doors removed;

FIG. 4 is a fragmentary plan view showing the carriage and the track section; and FIG. 5 is a vertical section of the gear box and showing the drive mechanism.

The drawings illustrate a tractor 1 which is connected to and hauls a trailer 2. A refrigerating unit 3 may be located in the forward wall of the trailer and serves to cool or refrigerate the trailer.

The trailer 2 comprises a pair of side walls 4, a top wall or ceiling 5 and a floor 6. A pair of guide tracks 7 are secured to the side walls 4 adjacent the ceiling 5 and a plurality of separate carriages 8 are adapted to ride on the guide tracks and support the carcass sections of meat 9 or other articles.

As best shown in FIG. 4, the track 7 is disposed within a recess 10 in the side wall 4 and a flashing sheet 11 is secured to the ceiling 5 and extends downwardly along the side wall 4, behind and under the track 7 and then down over the side wall to prevent moisture or condensation from seeping downwardly behind the guide track into the side wall 4.

Each of the carriages 8 which support the meat sections or other articles includes a pair of longitudinal end bars 12 which rotatably support a pair of rollers 13 which ride on the guide track 7. The end bars 12 are connected together by a cross bar 14 and a meat rail 15 is secured to the cross bar and is parallel thereto. The meat rail 15 is aligned midway between the axes of the rollers 13 so that the weight supported on the rail will be equally distributed to the rollers. In addition, the ends of the meat rail terminate short of the end bars 12 to provide sufficient clearance for the meat sections hung on the rail.

The carcass sections of meat 9 are suspended on hooks 16 and the upper end of each hook is engaged within the opening in a roller bracket 17. The upper end of the roller bracket has a reverse bend and a roller 18 is journaled therein. The roller is provided with a central recess which engages the rail 15 and the side edges of the roller straddle the rail and prevent lateral displacement of the roller from the rail.

To lock the carriages in any desired position along the length of the track, each end bar is provided with a locking pin 19 which is adapted to be engaged within one of a series of holes formed in the upper flange of the track 7. By inserting the pins within the openings in the track 7, the carriages can be locked against longitudinal movement within the trailer.

As best shown in FIG. 2, a locking arm 20 is pivotally attached to each side wall at the rear end of each track 7. The arm is counterweighted so that the forward portion of the arm will normally be located in the track to prevent the carriages from moving freely out of the rear end of the track.

The structure of the guide tracks, carriages, and roller units is substantially similar to that disclosed in the copending application of the same inventor, Serial No. 13,135, filed March 7, 1960, and entitled "Apparatus for Loading and Storing Articles."

According to the invention, a movable track section 21 is disposed in alignment with each guide track 7 and extends from the end of the track to the open rear end of the trailer. The track sections 21 are connected together by a pair of cross members 22 which are secured to the upper flanges of the track sections.

A plate 23 is secured to the lower flange of each track section and extends inwardly of the trailer, and a U-shaped bracket 24 is attached to each of the plates 23. A pair of arms 25 and 26 are pivotally connected to each U-bracket 24 at 27 and 28, respectively. As best shown in FIG. 2, the arms 25 and 26 are disposed in parallel relation and the pivotal connection 27 of arm 25 is located in a horizontal plane above the pivotal connection 28 of the arm 26.

The lower end of each of the arms 25 and 26 is pivotally connected to a plate 29 which is secured to the floor 6 of the trailer by bolts 30. As shown in FIG. 2, the pivotal connection 31 between arm 25 and plate 29 is located in a horizontal plane above the pivotal connection 32 between arm 26 and plate 29.

With this construction, each carriage 8 containing the meat carcass sections 9 is moved rearwardly along the tracks 7 onto the track section 21. With the carriage in this position, the arms 25 and 26 are then pivoted downwardly about the pivot points 31 and 32 to the dashed position as shown in FIG. 2, to thereby lower the track section and carriage to a position outwardly of the open end of the trailer and above the floor 6. In this location, the meat sections 9 can be conveniently removed from the hooks by workmen standing on the ground or on a loading dock.

Each bracket 24 is provided with a pair of spaced spring loaded stops 33 and 34. The stops are pivotally connected to the bracket 24 and the enlarged end of each stop is urged upwardly by a spring 35. As best shown in FIG. 2, the cross bar 14 of the carriage 8, when moved onto the track section 21, will pivot the stops 33 downwardly so that the carriage can move over the stops. However, the stops 34 will engage the cross bar 14 and prevent further rearward movement of the carriage. After the carriage has passed over the stops 33, the spring 35 will urge the stops 33 to the upper position to thereby lock the carriage between the stops 33 and 34 and prevent movement of the carriage with respect to the track sections 21 as the track sections are lowered. To remove the carriage 8 from the track sections 21, the stops 34 are manually depressed so that the carriage can ride thereover.

As the arms 25 and 26 are parallel and as the pivotal points of the arms 25 are located above the corresponding pivot points of the arms 26, the track sections 21 will be retained in a horizontal plane throughout their entire downward and outward movement.

To limit the downward movement of the arms, a stop 36 is secured to each side wall 4 adjacent the floor in a position where it will be engaged by the arm 26 and thereby limit the downward movement of the arm and track section 21.

A cable drive is employed to raise and lower the arms 25 and 26. A pair of cables 37 are each wound on reels 38 located beneath the floor 6 and each cable extends through an opening in floor 6, passes over a pulley 39 secured to the side wall 4, over a pulley 40 attached to the arm 25 and is dead ended on the side wall, as indicated at 41. The pulley 39 is rotatably supported within a bracket 42 secured to the side wall, while the pulley 40 is journaled within a bracket 43 connected to the arm 25 at a location adjacent the track section 21.

The pulleys 39 and 40 and dead end 41 are located such that the portion of the cable 37 extending between pulley 39 and pulley 40 is substantially parallel with that portion of the cable extending between the pulley 40 and the dead end 41. This insures that the maximum force will be applied to the arms to raise and lower the same.

To prevent dirt and other foreign material which may be attached to the cable from entering the trailer, a tubular shield 43a is secured between the pulley bracket 42 and the floor 6 so that the cable 37 will pass through the shield when moving from the reel 38 to the pulley 39.

The reels 38 are secured to shaft 44 which extends transversely of the trailer beneath the floor 6 and is journaled within brackets 45. A gear 46 is secured to the shaft 44 and engages a worm 47 attached to a shaft 48. The end of the shaft 48 carries a pulley 49 which is connected by a belt 50 to the drive shaft of a motor 51. Operation of the motor will thereby rotate shaft 48 to turn worm 47 and gear 46 to correspondingly rotate shaft 44 and wind or unwind the cable, depending on the direction of rotation of the motor drive shaft.

The use of the worm gear 47 is particularly important when using the cable drive, as shown in the drawings, for the worm prevents the free downward movement of the track section 21 by gravity. In order to lower the track section 21 with the meat suspended thereon, it is necessary to drive the worm which then permits gravity to lower the track section. The use of the worm serves as a braking device which controls the rate of lowering of the track section and permits the track section to be held at any position along its path of movement.

Rotation of the motor drive shaft in the opposite direction will correspondingly wind the cable onto the reels 38 to thereby pivot the arms 25 and 26 and track section 21 upwardly to the upper position, in which the track section is in alignment with the track 7.

In operation of the device, a series of carriages are loaded into the trailer and locked therein along the guide track 7. In some operations, the entire trailer may be filled with carriages supporting meat, while in other operations, only a minor proportion of the trailer may be occupied by the carriages 8.

When unloading, the rearmost carriage 8 is moved rearwardly onto the track section 21 and is locked with respect to the track section by the stops 33 and 34. With the carriage in this position, the motor 51 is then operated to unwind the cable 37 and the track section 21 and the carriage will then move downwardly by gravity to the position shown by the dashed lines in FIG. 2. In this lower position, the meat 9 can be easily removed from the hooks by workmen standing on the ground.

After the unloading, the carriage 8 is removed from the track section 21 and the track section is returned to its upper position by operation of the motor so that a second carriage 8 may be moved into position on the track section and subsequently lowered.

The present invention substantially increases the speed of unloading meat sections or other articles from a trailer or storage structure. With this apparatus, the entire load can be unloaded by a single workman which substantially reduces the labor cost over the normal unloading operation.

The apparatus is of simple construction and can be readily adapted to existing trailers which employ meat carrying rails or tracks.

Various modes of carrying out the invention are contemplated as being within the scope of the following claims particularly pointing out and distinctly claiming the subject matter which is regarded as the invention.

I claim:

1. An apparatus for unloading articles from a trailer having a pair of side walls, a floor and an open rear end, comprising a track secured to each side wall of the trailer and extending longitudinally thereof, a movable track section aligned with each track and extending from the rear end of the track to adjacent the open end of the trailer, a carriage extending transversely of the trailer and disposed to ride on the tracks and the track sections and adapted to removably support an article, means for pivotally connecting each track section to the trailer, drive means connected to the last named means for pivoting the same to move the track sections downwardly and outwardly of the open end of the trailer to a level where the article can be conveniently removed from the carriage, a first stop secured to one of said track sections, a second stop pivotally connected to one of said track sections and located forwardly of said first stop, said second stop adapted to be pivoted to an unobstructing position by the carriage as the carriage is moved rearwardly onto the track sections, and resilient means connected to said second stop for urging the second stop to an obstructing position, said carriage being held between the first and second stops to prevent movement of the carriage on the track sections as the track sections are moved with respect to the trailer.

2. An apparatus for unloading articles from a trailer having a pair of side walls, a floor and an open rear end, comprising a generally horizontal track secured to each side wall of the trailer and extending longitudinally thereof, a support member extending transversely of the trailer and having a track section pivotally connected to each end of the support member, said support member having an upper position in which the track sections are disposed in alignment with the corresponding tracks and having a lower position in which the track sections are disposed outwardly of the open end of the trailer and substantially beneath said tracks, a carriage disposed to ride on the tracks and on the track sections and adapted to removably support the articles, each track section having unobstructed front and rear ends to permit the carriage to pass freely onto either end of said track section, stop means connected to the support member and engageable with the carriage for preventing movement of the carriage on said track sections, removable stop means located at the rear end of at least one of said tracks for preventing free movement of the carriage from the rear end of said tracks, pivotal means connecting said support member to the trailer at a location substantially below the level of the track, drive means connected to said pivotal means for pivoting the same and simultaneously moving the support member between said upper and lower positions, and means for maintaining the track sections in a substantially horizontal attitude as the support member is moved between the upper and lower positions.

3. An apparatus for unloading articles from a trailer having a pair of side walls, a floor and an open rear end, comprising a track secured to each side wall of the trailer and extending longitudinally thereof, a movable track section aligned with each track and extending from the rear end of the track to adjacent the open end of the trailer, a carriage extending transversely of the trailer and having rollers at each end disposed to ride on the respective track and on the track sections and adapted to removably support an article, each track section having unobstructed front and rear ends to permit the carriage to pass freely onto either end of said track section, means for pivotally connecting each track section to the trailer, drive means connected to the last-named means for pivoting the same to move the track sections downwardly and outwardly of the open end of the trailer to a level where the article can be conveniently moved from the carriage, means for maintaining the track sections in a generally horizontal attitude as the track sections are pivoted downwardly and outwardly of the end of the trailer, and locking means for locking the carriage to the track sections as the track sections are being lowered and raised.

4. An apparatus for unloading articles from a trailer having a pair of side walls, a floor and an open rear end, comprising a generally horizontal track secured to each side wall of the trailer and extending longitudinally thereof, a support member extending transversely of the trailer and having a track section at each end, said support member having an upper position in which the track sections are disposed in alignment with the corresponding tracks and having a lower position in which the track sections are disposed outwardly of the open end of the trailer and substantially beneath said tracks, a carriage disposed to ride on the tracks and on the track sections and adapted to removably support the articles, a forward stop associated with the forward end of at least one of said track sections and having an obstructing position whereby said stop obstructs the movement of the carriage onto the track sections and having a non-obstructing position, means for biasing the forward stop into the obstructing position, a rear stop associated with the rear portion of at least one of said track sections, and having an obstructing position whereby said rear stop obstructs rearward movement of the carriage from said track sections and having a non-obstructing position, and second means for biasing said rear stop into the obstructing position, said carriage being held between said forward and rear stops to prevent movement of the carriage on the track sections as the track sections are moved with respect to the trailer.

References Cited in the file of this patent

UNITED STATES PATENTS

| | | |
|---|---|---|
| 1,341,996 | Plucienski | June 1, 1920 |
| 2,527,818 | Ives | Oct. 31, 1950 |
| 2,536,954 | Olsen | Jan. 2, 1951 |
| 2,758,730 | Tapp et al. | Aug. 14, 1956 |
| 2,778,512 | Strona | Jan. 22, 1957 |